US009429454B2

(12) United States Patent
Gao et al.

(10) Patent No.: US 9,429,454 B2
(45) Date of Patent: Aug. 30, 2016

(54) MAGNETIC FLOWMETER

(71) Applicant: Rosemount Inc., Chanhassen, MN (US)

(72) Inventors: Yanghui Gao, Jiangsu Province (CN);
Haipeng Wang, Jiangsu Province (CN)

(73) Assignee: Rosemount Inc., Chanhassen, MN (US)

( * ) Notice: Subject to any disclaimer, the term of this patent is extended or adjusted under 35 U.S.C. 154(b) by 219 days.

(21) Appl. No.: 14/113,637

(22) PCT Filed: Jul. 19, 2013

(86) PCT No.: PCT/CN2013/079689
§ 371 (c)(1),
(2) Date: Oct. 24, 2013

(87) PCT Pub. No.: WO2015/006975
PCT Pub. Date: Jan. 22, 2015

(65) Prior Publication Data
US 2015/0020607 A1      Jan. 22, 2015

(51) Int. Cl.
*G01F 1/58* (2006.01)
*G01F 1/60* (2006.01)

(52) U.S. Cl.
CPC .............. *G01F 1/588* (2013.01); *G01F 1/586* (2013.01); *G01F 1/60* (2013.01)

(58) Field of Classification Search
CPC .......... G01F 1/588; G01F 1/60; G01F 1/586; G01F 1/58; G01F 1/56; G01F 1/584; Y10T 29/49117
USPC .................................... 73/861.11–17; 29/825
See application file for complete search history.

(56) References Cited

U.S. PATENT DOCUMENTS 3,690,172 A    9/1972  Ketelsen et al.
4,409,846 A    10/1983  Ueno
(Continued)

FOREIGN PATENT DOCUMENTS

CN     203011446 U    6/2013

OTHER PUBLICATIONS

Notification of Transmittal of the International Searching Report and the Written Opinion of the International Searching Authority, or the Declaration for PCT Application No. PCT/CN2013/079689, dated Apr. 22, 2014, 4 pages.
(Continued)

*Primary Examiner* — Harshad R Patel
*Assistant Examiner* — Brandi N Hopkins
(74) *Attorney, Agent, or Firm* — Westman, Champlin & Koehler, P.A.

(57) ABSTRACT

A magnetic flowmeter for measuring flow rate of a process fluid includes: a magnetic coil arranged to apply a magnetic field to the process fluid. A pair of electrodes electrically couple to the process fluid and are arranged to sense a voltage induced in the process fluid related to the applied magnetic field and the flow rate of the process fluid. A flow tube of a non-conductive material is arranged to receive a flow of the process fluid therethrough. The flow tube carries the magnetic coil and the pair of electrodes. Flow meter circuitry applies a current to the magnetic coil and receives the voltage sensed by the pair of electrodes. A magnetic field spreader is positioned proximate the magnetic coil and is arranged to spread the magnetic field emanating from the magnetic coil and direct the magnetic field into the flow tube. An exterior wrapper extends around the assembly and completes a magnetic circuit.

17 Claims, 6 Drawing Sheets

(56) References Cited

U.S. PATENT DOCUMENTS

| | | |
|---|---|---|
| 5,398,553 A | 3/1995 | Hemp |
| 5,503,027 A | 4/1996 | Hemp |
| 5,540,103 A | 7/1996 | Zingg |
| 5,751,535 A | 5/1998 | Garcia-Gutierrez et al. |
| 2010/0024569 A1 | 2/2010 | Ehrenberg et al. |

OTHER PUBLICATIONS

International Search Report and Written Opinion for PCT Application No. PCTCN2013079689, dated Apr. 22, 2014, 11 pages.

Communication from European Patent Application No. 13889522.2, dated Feb. 26, 2016.

MAGNETIC FLOWMETER

CROSS-REFERENCE TO RELATED APPLICATION

This Application is a Section 371 National Stage Application of International Application No. PCT/CN2013/079689, filed Jul. 19, 2013, not yet published, the contents of which are hereby incorporated by reference in their entirety.

BACKGROUND

The present invention relates to flowmeters of the type that sense the flow of process fluid in industrial process plants. More specifically, the present invention relates to measurement of flow using a magnetic flowmeter.

Magnetic flowmeters are known in the art and typically utilize an electrically insulated flow tube that carries a flow of process fluid past an electromagnetic coil and past a pair of electrodes. The electromagnetic coil applies an electromagnetic field to the flowing process fluid. Due to Faraday's Law of electromagnetic induction, a voltage or Electromotive Force (EMF) is generated between the pair of electrodes in the fluid. This voltage is a function of the strength of the applied magnetic field and is proportional to the fluid's rate of flow.

The magnetic field can be generated by moving electrical charges. The magnetic field is often described using a mathematical description of the magnetic influence of electric currents and magnetic materials. The magnetic field at any given point is specified by a vector which has a direction and a magnitude (strength). The direction of the vector is determined by the direction in which the current is flowing through the coil. The strength and density of the magnetic field depends on the amount of the current and the area and shape of the coil. In particular, the total strength of the magnetic field increases with the length of the wire. For example, when a wire carrying a current is formed into a loop, the magnetic field concentrates inside the loop. When the wire is bent into multiple loops to form the coil, the magnetic field becomes even more concentrated.

SUMMARY

A magnetic flowmeter for measuring flow rate of a process fluid includes: a magnetic coil arranged to apply a magnetic field to the process fluid. A pair of electrodes electrically couple to the process fluid and are arranged to sense a voltage induced in the process fluid related to the applied magnetic field and the flow rate of the process fluid. A flow tube of a non-conductive material is arranged to receive a flow of the process fluid therethrough. The flow tube carries the magnetic coil and the pair of electrodes. Flow meter circuitry applies a current to the magnetic coil and receives the voltage sensed by the pair of electrodes. A magnetic field spreader is positioned proximate the magnetic coil and is arranged to spread the magnetic field emanating from the magnetic coil and direct the magnetic field into the flow tube. An exterior wrapper extends around the assembly and completes a magnetic circuit.

DETAILED DESCRIPTION OF ILLUSTRATIVE EMBODIMENTS

The present invention is directed to a magnetic flowmeter that measures a flow of process fluid through a flow tube. In one example embodiment, the magnetic flowmeter includes a magnetic field spreader positioned proximate a coil of the flowmeter. The magnetic field spreader can be arranged such that the magnetic field has a profile across the flow tube as desired. For example, the spreader can be configured such that the magnetic field is more evenly distributed across the width of the flow tube. Other profiles can also be formed as desired. In another example, aspect, the invention includes the use of a magnetic wrapper around an outer circumference of the flow tube to provide a magnetic circuit.

Figure 1:
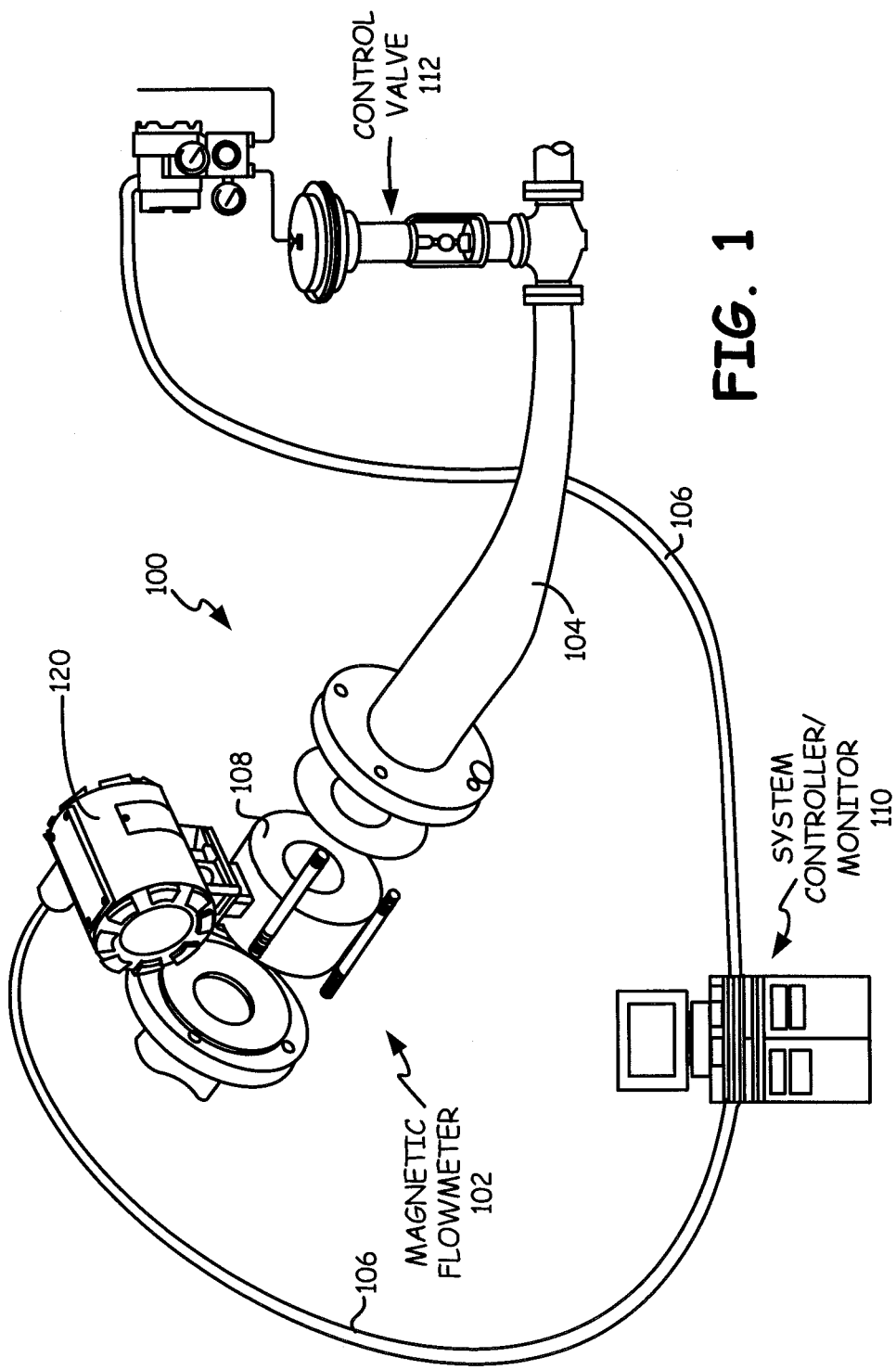
FIG. 1 is a diagram showing a process control system including a magnetic flowmeter.

FIG. 1 illustrates a typical environment 100 for magnetic flowmeter 102. Magnetic flowmeter 102 is shown coupled to process piping 104 that also couples to control valve 112. Magnetic flowmeter 102 is an example of one type of process variable transmitter which can be configured to monitor one or more process variables associated with fluids in a process plant such as slurries and liquids in chemicals, pulp, petroleum, gas, pharmaceutical, food and other fluid processing plants.

In a magnetic flowmeter, the monitored process variable relates to the velocity of process fluid through process piping and thus flow tube 108. Magnetic flowmeter 102 typically includes electronics housing 120 connected to flow tube 108. Magnetic flowmeter 102 outputs are configured for transmission over long distances to a controller or indicator via communication bus 106. In typical processing plants, communication bus 106 is a two-wire process control loop such as a 4-20 mA process control current loop, a FOUNDATION™ Fieldbus connection, a pulse output/frequency output, a Highway Addressable Remote Transducer (HART®) protocol communication, or other connection to a controller such as system controller/monitor 110 or other suitable device. Additionally, wireless communication techniques may be implemented as desired including WIFI, or others such as WirelessHART® in accordance with the IEC 62591 Standard. System controller 110 is programmed as a process monitor, to display flow information for a human operator or as a process controller to control the process using control valve 112 over communication bus 106.

Figure 2:
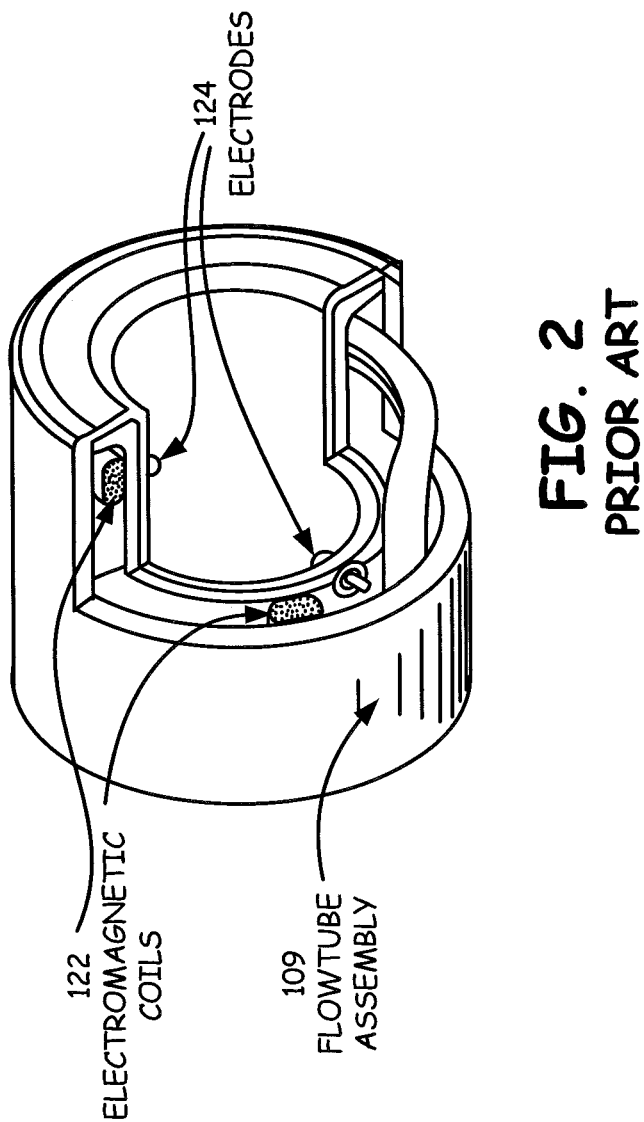
FIG. 2 is a partial cutaway view of a prior art magnetic flow tube assembly.

FIG. 2 is a perspective cutaway view of a prior art magnetic flow tube assembly 109 which can be used with magnetic flowmeter 102. Flow tube assembler 109 includes electromagnetic coils 122 which are configured in a saddle shape and used to induce a magnetic field in fluid flowing through flow tube assembly 109. Electrodes 124 in flow tube assembly 109 are used to sense the EMF generated in the fluid due to the velocity of the flow and the applied magnetic field.

Figure 3:
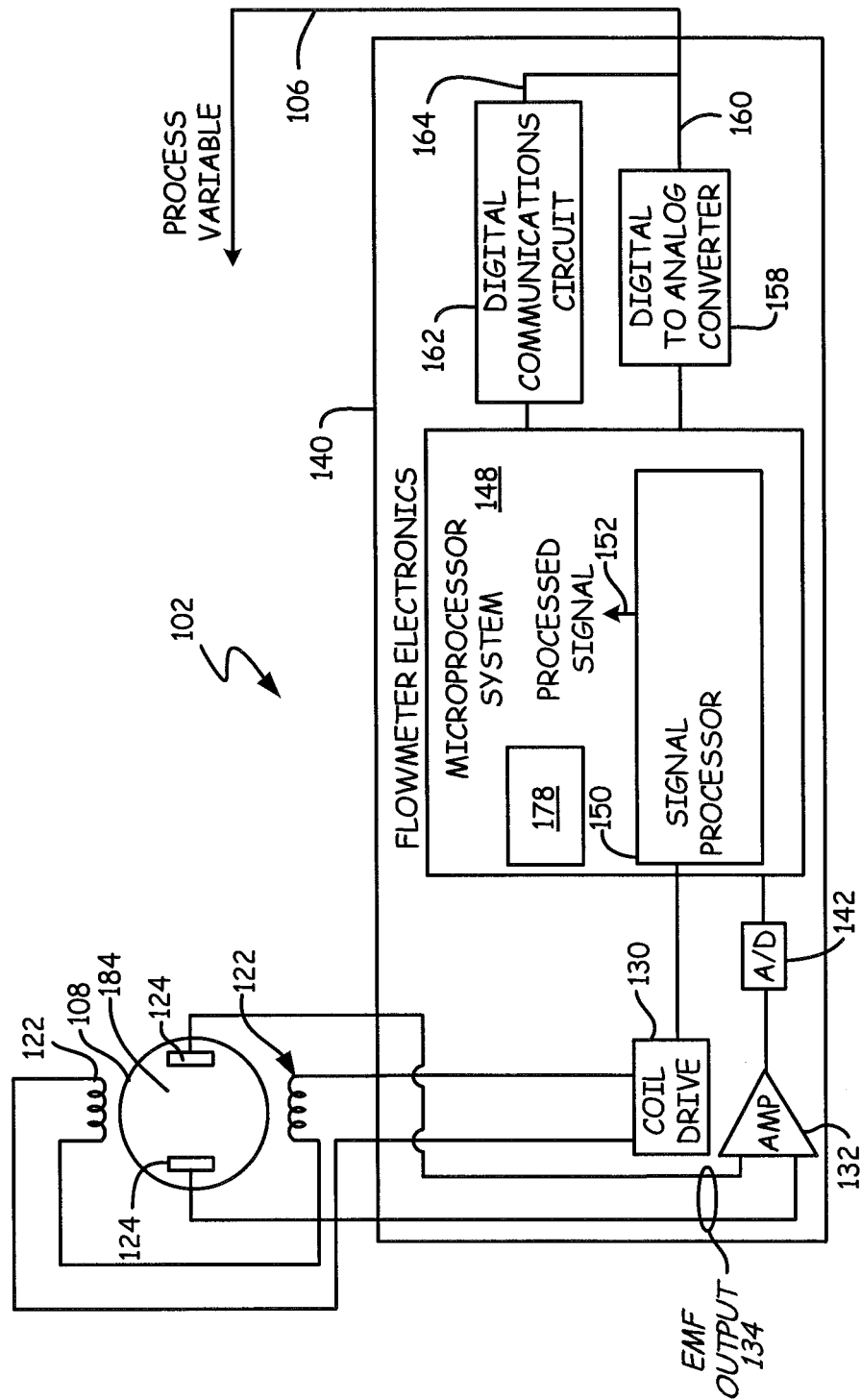
FIG. 3 is a simplified block diagram showing electrical components of a magnetic flowmeter.

FIG. 3 is a system block diagram of an embodiment showing various electrical components of a magnetic flowmeter for measuring a flow of a conductive process fluid through flow tube assembly 108. Coils 122 are configured to apply an external magnetic field in the fluid flow in response to an applied drive current from coil driver 130. Coil driver circuitry 130 provides the drive current to electromagnetic coils 122. EMF sensors (electrodes) 124 electrically couple to the fluid flow and provide an EMF signal output 134 to amplifier 132 related to an EMF generated in the fluid flow due to the applied magnetic field, and fluid velocity. Analog to digital converter 142 provides a digitized EMF signal to microprocessor system 148. A signal processor 150 is implemented in microprocessor system 148 of flow meter electronics 140 which couples to the EMF output 134 to provide an output 152 related to fluid velocity. Memory 178 can be used to store program instructions or other information as discussed below.

Microprocessor system 148 calculates velocity through flow tube 108 in accordance with a relationship between the EMF output 134 and the flow velocity as set forth in Faraday's law, which states:

$$V = \frac{E}{kBD} \qquad \text{Eq. 1}$$

Where E is the EMF output 134, V is the velocity of the fluid, D is the diameter of flow tube 108. B is the strength of the magnetic field in the fluid applied by the flow tube coils 122, and k is a constant of proportionality. A digital to analog converter 158 can be included and coupled to microprocessor system 148 to optionally generate an transmitter output 160, if desired, for coupling to communication bus 106. A digital communication circuit 162 optionally generates a digital transmitter output 164. The analog output 160 and the digital output 164 can be coupled to process controllers or monitors as desired.

Figure 4A:
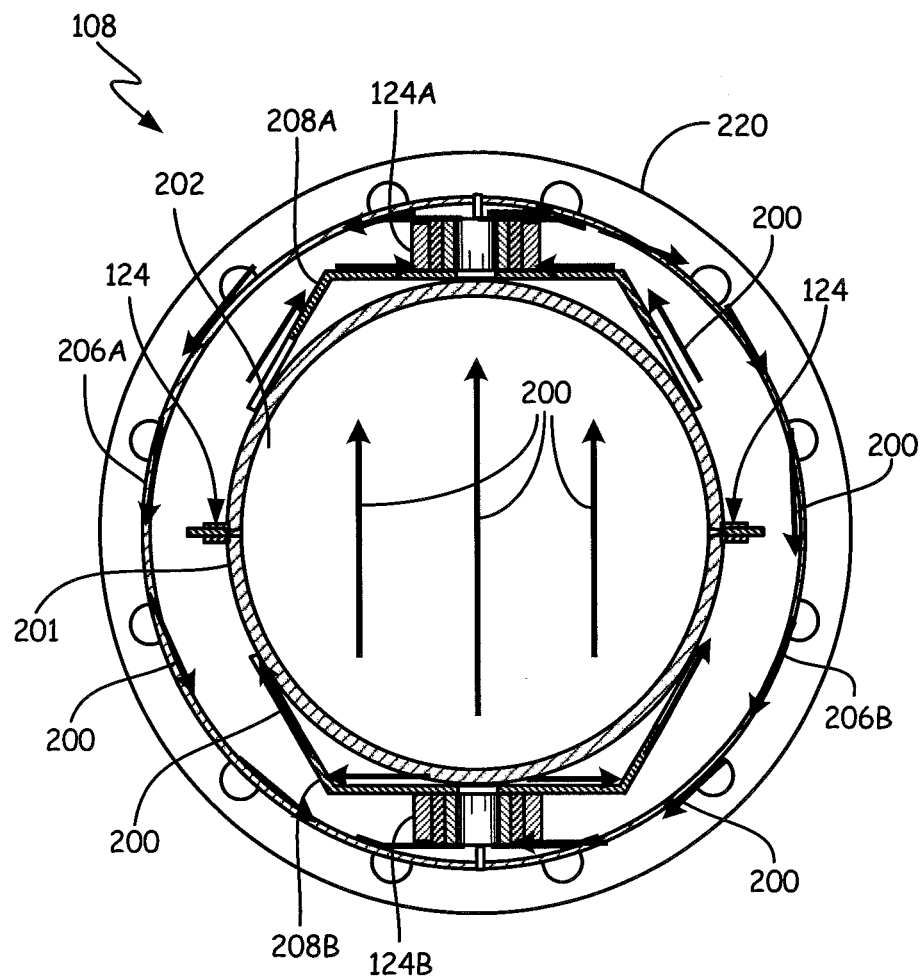
FIG. 4A is a front cross-sectional view of a magnetic flow tube assembly in accordance with one example embodiment of the present invention.
Figure 4B:
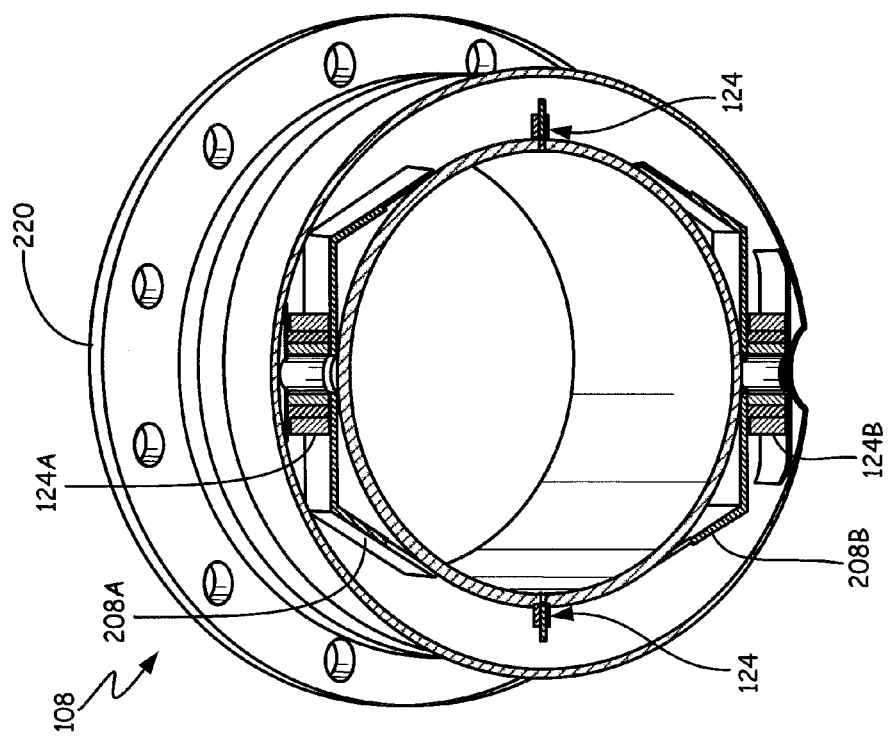
FIG. 4B is a first cross-sectional perspective view of the magnetic flow tube assembly of FIG. 4A.
Figure 4D:
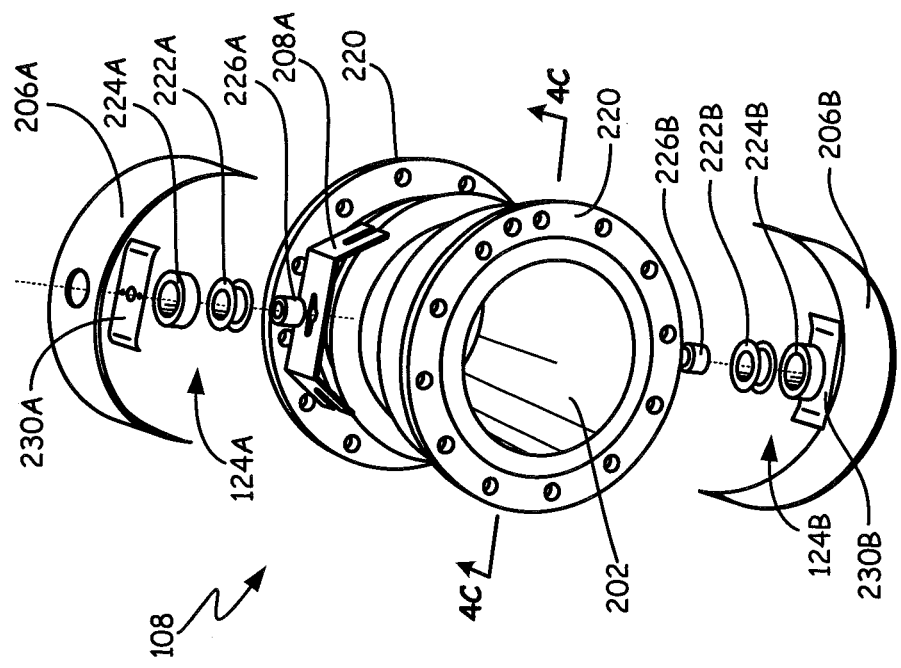
FIG. 4D is a perspective exploded view of the magnetic flow tube assembly of FIG. 4A.
Figure 4C:
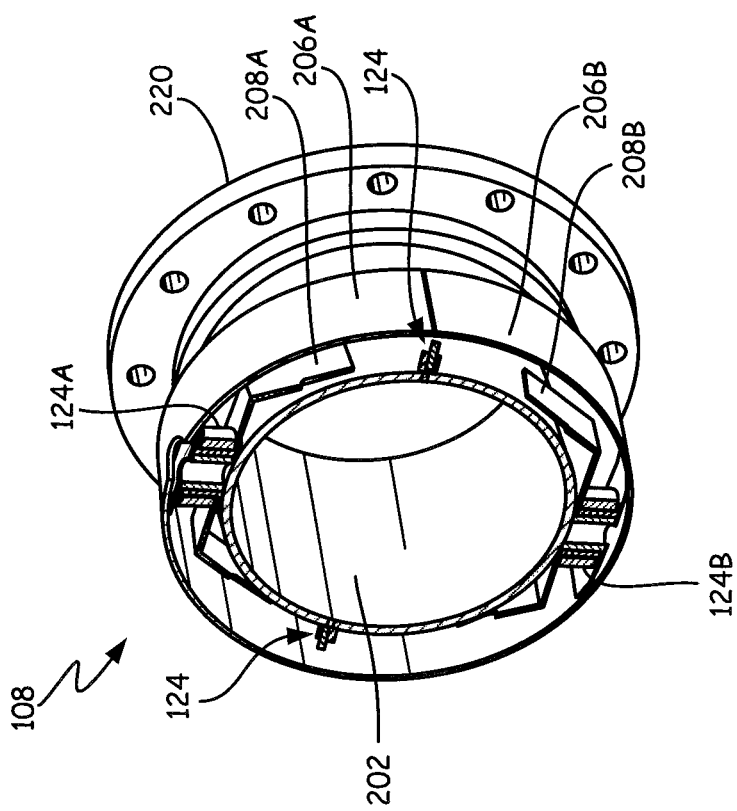
FIG. 4C is a second cross-sectional perspective view of the magnetic flow tube assembly of FIG. 4A.

FIGS. 4A, 4B, 4C, and 4D show various views of a magnetic flow tube 108 in accordance with one example embodiment of the present invention. Magnetic flow tube 108 couples to the magnetic flowmeter 102 as illustrated in FIGS. 1 and 3. FIG. 4A is a cross-sectional view, FIG. 4B is a first perspective cross-sectional view, FIG. 4C is a second perspective cross-sectional view and FIG. 4D is an exploded view of flow tube assembly 108 in accordance with one example embodiment of the present invention.

Referring to FIG. 4A, electromagnetic coils 124 generate a magnetic flux illustrated by arrows 200. The magnetic flow tube assembly 108 has at least an interior face which is formed of a non-conductive material. The process fluid flows through the interior flow tube 201 in a direction which is perpendicular to the cross-section illustrated in FIG. 4A. The magnetic flux 200 extends through an interior portion 202 of the magnetic flow tube assembly 108 whereby the flux 200 passes through process fluid flowing through the flow tube assembly 108. The magnetic flux lines 200 form a magnetic circuit in which the generated magnetic flux flows from coil 124B to coil 124A. For reference in FIG. 4A, the magnetic coil which receives the magnetic flux from the flow tube is identified as 124A and the magnetic coil from which the magnetic flux enters the flow tube assembly is identified as 124B. Note that the direction of the flux lines 200 may periodically reverse during operation. A magnetic circuit is formed by magnetic wrappers 206A and 206B positioned proximate an outer circumference of flow tube assembly 108 proximate electromagnetic coils 124A and 124B, respectively. Wrappers 206A, B for a tube exterior housing of flow tube assembly 108. Some prior art configurations utilize a tube exterior housing which is separate from the magnetic wrapper. Magnetic field spreaders 208A and 208B are positioned proximate an interior circumference of the magnetic flow tube assembly 108 proximate electromagnetic coils 124A and 124B, respectively. The arrows 200 which extend along wrappers 206A,B and spreaders 208A, B, along with arrows 200, shown in FIG. 4A illustrate the direction of the magnetic flux along the magnetic circuit within flow tube assembly 108. FIGS. 4B, 4C, and 4D show similar elements in different views. Additionally, in the exploded view of 4D, additional components are illustrated. In FIG. 4D, flanges 220 are shown on opposed ends of flow tube assembly 108 which are used to couple the flow tube assembly 108 to process piping such as the process piping 104 shown in FIG. 1. The electromagnetic coils 124A and B are formed by a coil spool 222A, 222B, coil wiring 224A, 224B, and coil cores 226A, 226B, respectively. A magnetic metal piece 230A and 230B secures coils 124A and 124B between wrappers 206A, 206B and magnetic spreaders 208A, 208B, respectively. Pieces 230A, B form a magnetic circuit and magnetically couple coils 124 A, B to wrappers 206A, B, respectively.

In accordance with one example embodiment of the present invention, the magnetic spreaders 208A, 208B, cause the magnetic flux 200 which extends through the interior 202 of flow tube assembly 108 to be more evenly distributed across a cross-section of the interior portion 202. As illustrated in FIG. 4A, the magnetic spreaders 208A, 208B cause the magnetic flux to be spread radially beyond the edges of the electromagnetic coils 124A and 124B. Thus, the magnetic field 200 in the interior portion 202 can be configured whereby the exposure of the process fluid to the applied magnetic field 200 is more evenly distributed across a profile of the process fluid taken perpendicular to an axis of the flow tube assembly 108. In the illustrated configuration, the spreaders 208A,B spread the magnetic field 200 radially across the flow tube assembly 108. The profile of the magnetic field within the flow tube assembly 108 can be configured as desired. For example, by changing the shape and/or materials of the spreaders 208A,B, the magnetic field 200 can be configured to change in strength across the profile. In one example configuration, the profile strength may be increased in the center of the flow tube assembly 108 because there is a greater amount of process fluid flowing through this region. In another example, the spreaders 208A,B are configured to increase the strength of the magnetic field proximate the interior wall of the flow tube assembly 108.

The various components of the flow tube assembly can be fabricated as desired. For example, the wrappers 206A, 206B magnetic metal piece 230A, 230B as well as magnetic spreaders 208A, 208B can comprise a magnetic material for use in creating a magnetic circuit. These components may be fabricated as a single piece of magnetic material or may be formed by multiple piece such as by laminations.

In the illustrated configuration, the magnetic wrappers 206A, 206B form a completely closed magnetic circuit around the outer circumference of the flow tube assembly 108. This reduces loss in the strength of the applied magnetic field 200. Magnetic spreaders 208A, 208B have a space formed therebetween which causes the magnetic field 200 to span this gap with a desired profile. However, other configurations may also be employed as desired.

Although the present invention has been described with reference to preferred embodiments, workers skilled in the art will recognize that changes may be made in form and detail without departing from the spirit and scope of the invention. Although various components have been illustrated with exemplary shapes and configurations, the present invention is not limited to the shapes and configurations. The wrappers, spreaders and coils may be changed as desired. Any appropriate material may be used for these components. Similarly, the flow tube assembly may have other configurations. The flowmeter circuitry may operate as desired and is not limited to the particular electrical configuration shown herein. Similarly, in some configurations, the flowmeter of the present invention may be used without requiring a process control loop. The applied magnetic field may be a state field or may vary with time. In some configurations, the applied magnetic field may alternate polarity and reverse directions. As used herein, the term "flow tube" refers to the magnetic flow tube assembly. Although two magnetic wrappers are shown herein, any configuration of magnetic wrappers may be employed in order to provide a complete magnetic circuit. Similarly, any number of magnetic spreaders may be used as desired. In some configurations, any number of magnetic coils and/or electrodes may be employed. As used herein, "exterior" refers to a piece or component which is directly exposed to an external environment.

What is claimed is:

1. A magnetic flowmeter for measuring flow rate of a process fluid, comprising:
    a flow tube arranged to receive a flow of the process fluid therethrough;
    a first magnetic coil arranged proximate the flow tube to apply a magnetic field to the process fluid flowing through the flow tube;
    a pair of electrodes electrically coupled to the process fluid in the flow tube and arranged to sense a voltage induced in the process fluid related to the applied magnetic field and a flow rate of the process fluid;
    flow meter circuitry configured to apply an electric current to the first magnetic coil and receive the voltage sensed by the pair of electrodes;
    a first magnetic field spreader positioned proximate the first magnetic coil arranged to spread the magnetic field from the first magnetic coil and direct the magnetic field into the flow tube in a plane perpendicular to the flow of process fluid; and
    a tube exterior housing which extends around the flow tube and forms a portion of a magnetic circuit with the first magnetic coil, wherein the tube exterior housing comprises a magnetic wrapper which extends around an outer circumference of the flow tube in the plane perpendicular to flow of process fluid and is magnetically coupled to the first magnetic coil.

2. The magnetic flowmeter of claim 1 including a second magnetic coil arranged proximate the flow tube to receive the applied magnetic field from the first magnetic coil, and wherein the tube exterior housing extends between first and second coils.

3. The magnetic flowmeter of the claim 2 including a second magnetic field spreader positioned proximate the second magnetic coil.

4. The magnetic flowmeter of claim 1 wherein the first magnetic field spreader directs the magnetic field into the flow tube with a profile substantially evenly distributed across a cross-section of the flow tube perpendicular to an axis of the flow tube.

5. The magnetic flowmeter of claim 1 wherein the first magnetic field spreader directs the magnetic field into the flow tube with an intensity that varies across a cross-section of the flow tube perpendicular to an axis of the flow tube.

6. The magnetic flowmeter of claim 1 wherein the magnetic wrapper is laminated.

7. The magnetic flowmeter of claim 1 wherein the first magnetic field spreader is laminated.

8. The magnetic flowmeter of claim 1 wherein the tube exterior housing comprises two semicircles.

9. A method of measuring flow of process fluid using a magnetic flowmeter, comprising:
    receiving the flow of process fluid through a flow tube;
    applying a magnetic field to the flow of process fluid through the flow tube using a first magnetic coil carried by the flow tube;
    sensing a voltage generated in the process fluid which is related to the applied magnetic field and a flow rate of the process fluid through the flow tube;
    determining the flow rate of the process fluid based upon the sensed voltage;
    spreading the magnetic field which emanates from the first magnetic coil and directing a spread magnetic field into the flow tube in a plane perpendicular to the flow of process fluid using a first magnetic field spreader positioned proximate to the magnetic coil; and
    completing a magnetic circuit with a tube exterior housing magnetically coupled to the magnetic coil, wherein the tube exterior housing comprises a magnetic wrapper which extends around an outer circumference of the flow tube in the plane perpendicular to flow of process fluid and is magnetically coupled to the first magnetic coil.

10. The method of claim 9 including providing a second magnetic coil arranged to receive the applied magnetic field from the first magnetic coil.

11. The method of the claim 10 including providing a second magnetic field spreader positioned proximate the second magnetic coil.

12. The method of claim 9 wherein the first magnetic field spreader directs the magnetic field into the flow tube with a profile substantially evenly distributed across a cross-section of the flow tube perpendicular to an axis of the flow tube.

13. The method of claim 9 wherein the first magnetic field spreader directs the magnetic field into the flow tube with an intensity that varies across a cross-section of the flow tube perpendicular to an axis of the flow tube.

14. The method of claim 9 wherein the magnetic wrapper is laminated.

15. The method of claim 9 wherein the first magnetic field spreader is laminated.

16. The method of claim 9 including forming the tube exterior housing with two semicircles.

17. A flow tube assembly for use with a magnetic flowmeter for measuring flow rate of a process fluid, comprising:
    a flow tube arranged to receive a flow of the process fluid therethrough;
    a first magnetic coil arranged proximate the flow tube to apply a magnetic field to the process fluid flowing through the flow tube;
    a pair of electrodes electrically coupled to the process fluid in the flow tube and arranged to sense a voltage induced in the process fluid related to the applied magnetic field and a flow rate of the process fluid;
    a first magnetic field spreader positioned proximate the first magnetic coil arranged to spread the magnetic field from the first magnetic coil and direct the magnetic field into the flow tube in a plane perpendicular to the flow of process fluid; and a tube exterior housing which extends around the flow tube and forms a portion of a magnetic circuit with the first magnetic coil, wherein the tube exterior housing comprises a magnetic wrapper which extends around an outer circumference of the flow tube in the plane perpendicular to flow of process fluid and is magnetically coupled to the first magnetic coil.

* * * * *